(12) United States Patent
Ioffe

(10) Patent No.: US 7,684,594 B2
(45) Date of Patent: Mar. 23, 2010

(54) METHOD AND APPARATUS FOR ESTIMATING OBJECT PART LOCATION IN DIGITAL IMAGE DATA USING FEATURE VALUE ANALYSIS

(75) Inventor: Sergey Ioffe, Mountain View, CA (US)

(73) Assignee: Fujifilm Corporation, Tokyo (JP)

( * ) Notice: Subject to any disclaimer, the term of this patent is extended or adjusted under 35 U.S.C. 154(b) by 1078 days.

(21) Appl. No.: 11/349,202

(22) Filed: Feb. 8, 2006

(65) Prior Publication Data

US 2007/0183686 A1    Aug. 9, 2007

(51) Int. Cl.
G06K 9/46 (2006.01)
G06T 7/00 (2006.01)
(52) U.S. Cl. ..................... 382/118; 382/190; 382/291
(58) Field of Classification Search .............. 382/118, 382/190, 291; 340/5.53, 5.83
See application file for complete search history.

(56) References Cited

U.S. PATENT DOCUMENTS

| | | | | |
|---|---|---|---|---|
| 5,696,838 A | * | 12/1997 | Chiu et al. | ............ 382/159 |
| 6,647,139 B1 | * | 11/2003 | Kunii et al. | ............ 382/159 |
| 7,391,889 B2 | * | 6/2008 | Kim et al. | ............ 382/118 |
| 7,551,755 B1 | * | 6/2009 | Steinberg et al. | ............ 382/118 |
| 7,564,994 B1 | * | 7/2009 | Steinberg et al. | ............ 382/118 |
| 2002/0136449 A1 | | 9/2002 | Park et al. | |
| 2005/0105780 A1 | | 5/2005 | Ioffe | |
| 2005/0190963 A1 | | 9/2005 | Li | |

* cited by examiner

Primary Examiner—Jon Chang
(74) Attorney, Agent, or Firm—Birch, Stewart, Kolasch & Birch, LLP

(57) ABSTRACT

A method and an apparatus estimate an object part location in a digital image using feature value analysis. The method according to one embodiment accesses digital image data representing a region including an object part of a digital image; accesses reference data including class data of classes relating to predetermined positions of the object part in predetermined regions, and features that discriminate among the classes; calculates feature values for the features in the region using pixel values within the region; and determines a location estimate of the object part using the feature values and the reference data.

24 Claims, 15 Drawing Sheets

METHOD AND APPARATUS FOR ESTIMATING OBJECT PART LOCATION IN DIGITAL IMAGE DATA USING FEATURE VALUE ANALYSIS

CROSS-REFERENCE TO RELATED APPLICATION

This non-provisional application is related to co-pending non-provisional application Ser. No. 11/349,205 filed on Feb. 8, 2006 and titled "Method and Apparatus for Localizing an Object Part in Digital Image Data" filed concurrently herewith, the entire contents of which are hereby incorporated by reference.

BACKGROUND OF THE INVENTION

1. Field of the Invention

The present invention relates to a digital image processing technique, and more particularly to a method and apparatus for locating objects in a digital image.

2. Description of the Related Art

Face recognition plays an important role in digital image processing techniques concerned with the study and processing of human faces. Face recognition systems can be included in security systems used in identification of people's identities; can help organize media such as photographs that include faces; etc.

When presented with images including people and objects, a known face recognition system identifies where people's faces are located in the images. The face recognition system then selects for processing only the faces of the people in the images. The task of face identification is complicated by non-face areas and objects present in images, as well as by variability in pose, lighting, expression, etc., of people's faces in images. Techniques to localize human faces in images can help a face recognition system identify which areas in an image are relevant. Moreover, techniques to localize human faces in images can be adapted for use in identifying many other types of objects besides faces. For example, such techniques could be used to identify buildings, trees, cars, etc.

A few publications have studied object identification in digital images. One such technique is described in US Patent Application 2002/0136449 A1 entitled "Apparatus and Method for Extracting Object Based on Feature Matching Between Segmented Regions in Images." The method described in this work extracts an object from an object extraction target image using pixel-based feature matching between the object extraction target image and a query image, which is a reference image of the object. The query and target images are segmented and matched based on features including color and texture. This method, however, is dependent on the existence of a reference image of an object, and in many cases such a reference image is not available.

Another technique for object identification in digital images is described in US Patent Application 2005/0190963 A1 entitled "Target Object Detecting Method, Apparatus, and Program." The method described in this work detects objects that are known to exist but have not been detected by other standard target object detection processes. A plurality of characteristic target object detecting processes, each corresponding to a predetermined specific characteristic of the target object, is performed to detect the target object. This method, however, uses predetermined characteristics of target objects, which might restrict the detection process and present challenges when presented with objects of variable characteristics, or with objects that do not feature the predetermined characteristics.

A disclosed embodiment of the application addresses these and other issues by utilizing a method and apparatus to estimate the location of a part of an object in a digital image. The method and apparatus use feature value analysis to determine and refine the location estimate of an object part.

SUMMARY OF THE INVENTION

The present invention is directed to a method and an apparatus for estimating an object part location in a digital image using feature value analysis. According to a first aspect of the present invention, a method of estimating an object part location in a digital image using feature value analysis comprises: accessing digital image data representing a region including an object part of a digital image; accessing reference data including class data of classes relating to predetermined positions of the object part in predetermined regions, and features that discriminate among the classes; calculating feature values for the features in the region using pixel values within the region; and determining a location estimate of the object part using the feature values and the reference data.

According to a second aspect of the present invention, an apparatus for estimating an object part location in a digital image using feature value analysis comprises: an image data unit for providing digital image data representing a region including an object part of a digital image; a reference data unit for storing reference data including class data of classes relating to predetermined positions of the object part in predetermined regions, and features that discriminate among the classes; and a feature analysis unit for estimating location of the object part in the region, the feature analysis unit estimating location of the object part by calculating feature values for the features in the region using pixel values within the region, and determining a location estimate of the object part using the feature values and the reference data from the reference data unit.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Figure 1:
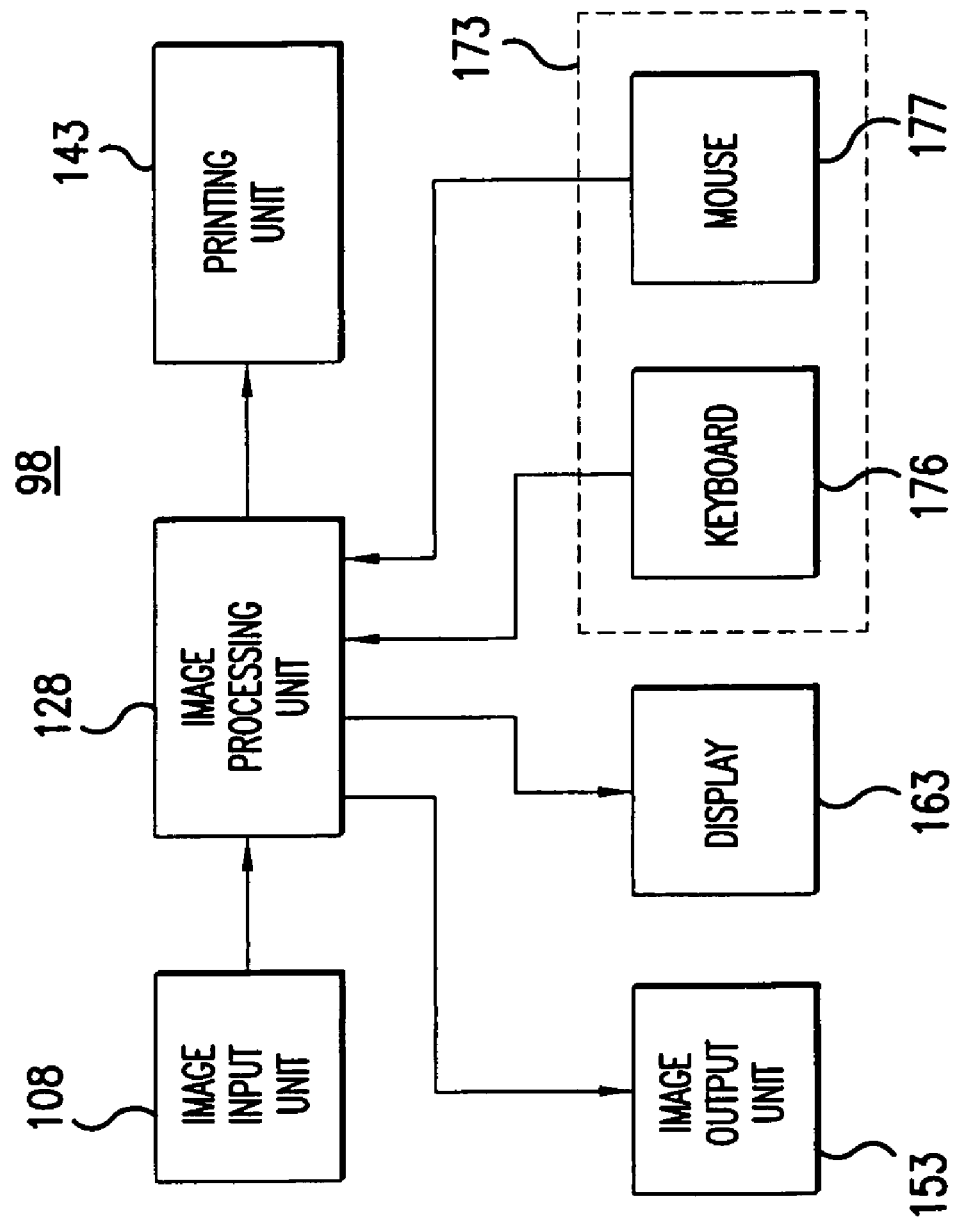
FIG. 1 is a general block diagram of a system including an image processing unit for object part location estimation using feature value analysis according to an embodiment of the present invention.

Aspects of the invention are more specifically set forth in the accompanying description with reference to the appended figures. FIG. 1 is a general block diagram of a system including an image processing unit for object part location estimation using feature value analysis according to an embodiment of the present invention. The system 98 illustrated in FIG. 1 includes the following components: an image input unit 108; an image processing unit 128; a display 163; an image output unit 153; a user input unit 173; and a printing unit 143. Operation of the system 98 in FIG. 1 will become apparent from the following discussion.

The image input unit 108 provides digital image data. The digital image data represents images that include various objects such as people, faces, buildings, etc. Image input unit 108 may be one or more of any number of devices providing digital image data, such as: a scanner for scanning black and white or color images recorded on film; a digital camera; a recording medium such as a CD-R, a floppy disk, a USB drive, etc.; a database system which stores images; a network connection; an image processing system that outputs digital data, such as a computer application that processes images; etc.

The image processing unit 128 receives digital image data from the image input unit 108 and estimates object part locations using feature value analysis in a manner discussed in detail below. A user, e.g., an operator at a security facility that uses face recognition systems, may view outputs of image processing unit 128, including intermediate results of object part location estimation, via display 163 and may input commands to the image processing unit 128 via the user input unit 173. In the embodiment illustrated in FIG. 1, the user input unit 173 includes a keyboard 176 and a mouse 177. In addition to estimating object part locations using feature value analysis in accordance with embodiments of the present invention, the image processing unit 128 may perform additional image processing functions, such as image correction functions, compression, etc. in accordance with commands received from the user input unit 173.

The printing unit 143 receives the output of the image processing unit 128 and generates a hard copy of the processed image data. Printing unit 143 may expose a light-sensitive material according to image data output by the image processing unit 128 to record an image on the light-sensitive material. The printing unit 143 may take on other forms, such as a laser printer. In addition or as an alternative to generating a hard copy of the output of the image processing unit 128, the processed image data may be output as an image file, e.g., via a portable recording medium or via a network (not shown). The output of image processing unit 128 may also be sent to an image output unit 153 that performs further operations on image data for various purposes.

Figure 2:
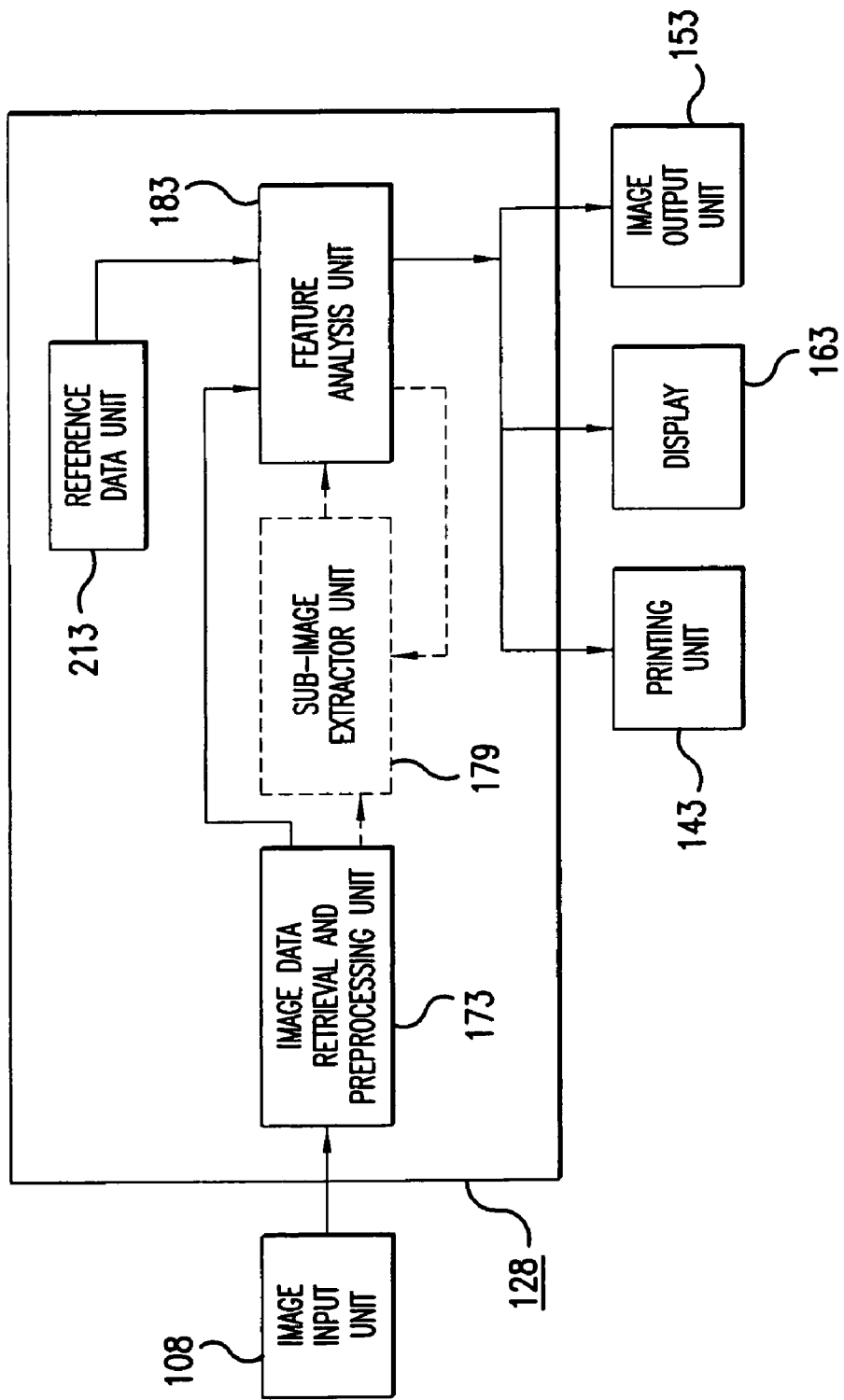
FIG. 2 is a block diagram of an image processing unit for object part location estimation using feature value analysis according to an embodiment of the present invention.

FIG. 2 is a block diagram of an image processing unit 128 for object part location estimation using feature value analysis according to an embodiment of the present invention. As shown in FIG. 2, the image processing unit 128 according to this embodiment includes: an image data retrieval and preprocessing unit 173; an optional sub-image extractor unit 179; a feature analysis unit 183; and a reference data unit 213. Although the various components of FIG. 2 are illustrated as discrete elements, such an illustration is for ease of explanation and it should be recognized that certain operations of the various components may be performed by the same physical device, e.g., by one or more microprocessors. Generally, the arrangement of elements for the image processing unit 128 illustrated in FIG. 2 retrieves digital image data, performs preprocessing operations on digital image data, and estimates an object part location using feature value analysis and reference data. Image data retrieval and preprocessing unit 173 receives digital image data from image input unit 108 and performs preprocessing operations on digital image data. Digital image data can be raw images that include various objects such as people, faces, buildings, etc. Preprocessing operations on digital image data may include resizing, cropping, image registration, etc.

An image included in the digital image data may contain objects such as faces, buildings, etc. An object part is a section of the image that includes a part of an object. As an example, in an image including a face as object, an object part can be an eye of the face. A sub-image of an image is a region that is connected to an object part by extending over or around the location of the object part. As an example, in an image including a face as object and an eye as an object part, a sub-image can be a region, or window, that includes the eye or a part of the eye.

Image data retrieval and preprocessing unit 173 sends preprocessed digital image data to feature analysis unit 183. Feature analysis unit 183 estimates object part locations in digital image data by calculating feature values for regions with object parts and comparing the calculated feature values to reference data from reference data unit 213. Feature analysis unit 183 communicates results of object part location analysis to sub-image extractor unit 179, if sub-image extractor unit 179 is present. Sub-image extractor unit 179 then performs selection of object part sub-images. Feature analysis unit 183 can perform object part location estimation several times for the same object part. The outputs of feature analysis unit 183 are position estimates for one or more object part locations in a digital image. Feature analysis unit 183 outputs digital image data together with position estimate for one or more object part locations. Such digital image data with position estimates may be output to image output unit 153, printing unit 143, and/or display 163. Image data retrieval and preprocessing unit 173 can also communicate directly with sub-image extractor unit 179.

Operation of the components included in image processing unit 128 illustrated in FIG. 2 will be next described with reference to FIG. 3. Image data retrieval and preprocessing unit 173, sub-image extractor unit 179, feature analysis unit 183, and reference data unit 213 are software systems/applications.

Figure 3:
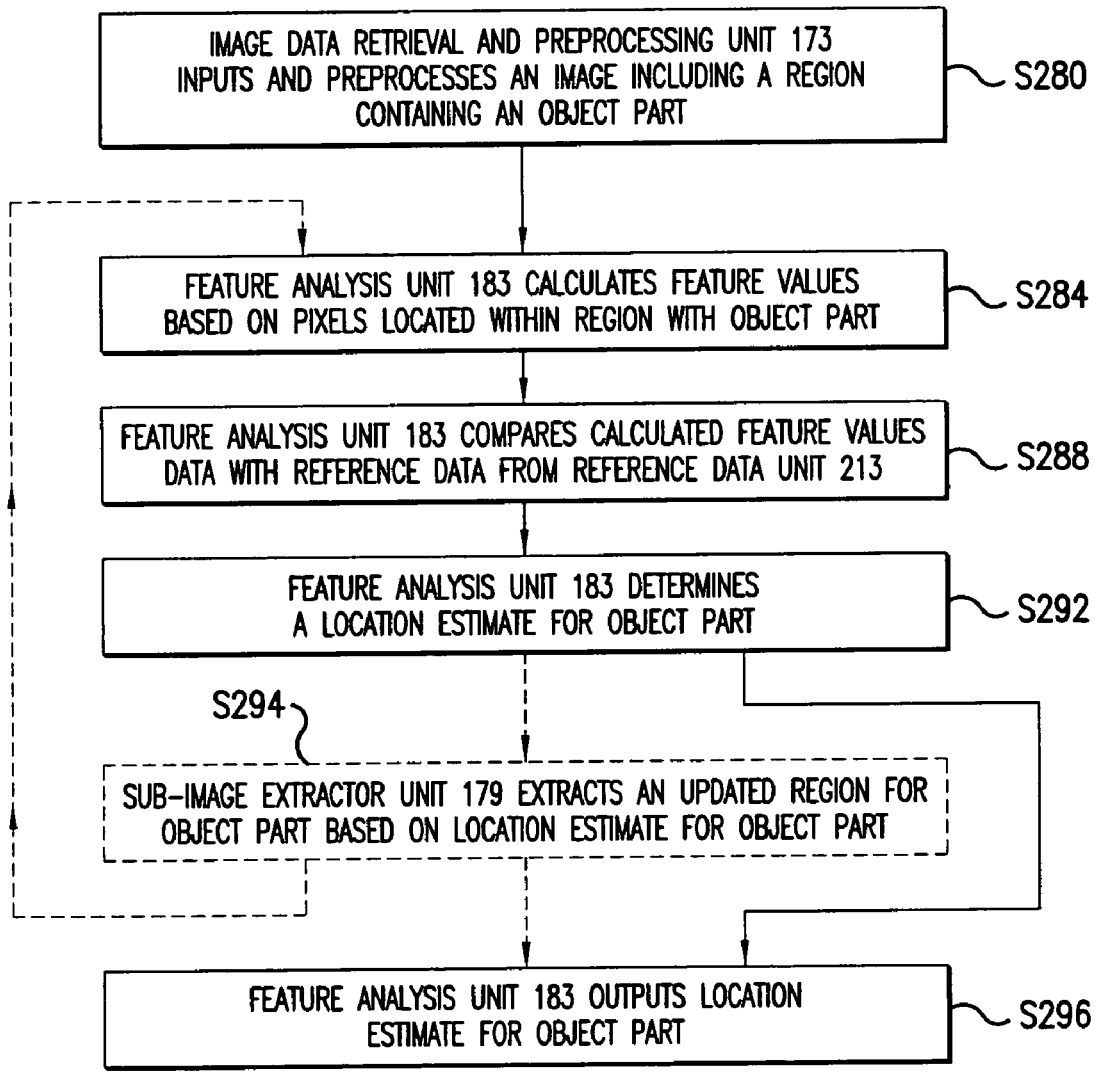
FIG. 3 is a flow diagram illustrating operations performed by an image processing unit for object part location estimation using feature value analysis according to an embodiment of the present invention illustrated in FIG. 2.

FIG. 3 is a flow diagram illustrating operations performed by an image processing unit 128 for object part location estimation using feature value analysis according to an embodiment of the present invention illustrated in FIG. 2. Image data retrieval and preprocessing unit 173 inputs and preprocesses an image including a region that contains an object part (S280). Preprocessing operations on the image may include image cropping, rotation, registration, etc. Feature analysis unit 183 receives the object part region and calculates feature values based on pixels located within the object part region (S284). Feature analysis unit 183 then compares calculated feature values to reference data from reference data unit 213 (S288), and determines a location estimate for the object part (S292). Reference data unit 213 may include reference tables, values, or other types of data relevant to the object part being analyzed. Feature analysis unit 183 then outputs the determined location estimate of the object part (S296). Such location results may be output to image output unit 153, printing unit 143, and/or display 163.

Feature analysis unit 183 can also send the location estimate for the object part to sub-image extractor unit 179, which extracts an updated region for the object part based on the received location estimate (S294). Sub-image extractor unit 179 sends the updated object part region to feature analysis unit 183, which then calculates feature values based on pixels located within the updated region of the object part (S284). Feature analysis unit 183 then compares the calculated feature values to reference data from reference data unit 213 (S288), and determines an updated location estimate for the object part (S292). Steps S284, S288, S292 and S294 may be repeated iteratively to refine the location estimate for the object part. The iteration stops when the location estimate is good enough. The number of iterations is predetermined by training. In one implementation, 6 iterations were used. After it was determined that after the $3^{rd}$ iteration improvements are marginal, the number of iterations was reduced to 3. After the last iteration, feature analysis unit 183 outputs the refined location estimate of the object part (S296). Such location results may be output to image output unit 153, printing unit 143, and/or display 163.

Figure 4:
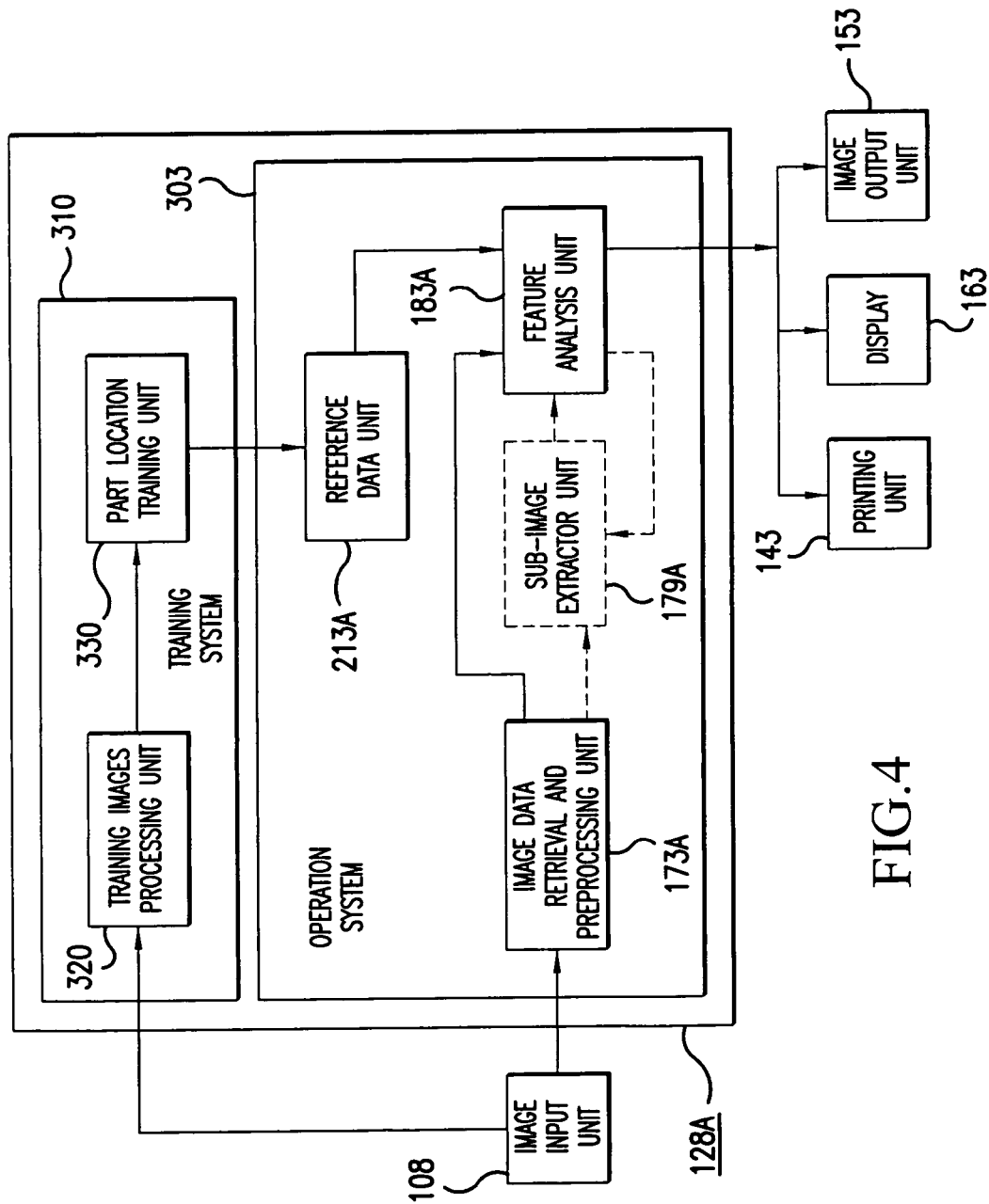
FIG. 4 is a block diagram illustrating components of an image processing unit for object part location estimation using feature value analysis according to a second embodiment of the present invention.

FIG. 4 is a block diagram illustrating components of an image processing unit 128A for object part location estimation using feature value analysis according to a second embodiment of the present invention. As shown in FIG. 4, the image processing unit 128A includes the following components: an image data retrieval and preprocessing unit 173A; an optional sub-image extractor unit 179A; a feature analysis unit 183A; a reference data unit 213A; a training images processing unit 320; and a part location training unit 330. Image data retrieval and preprocessing unit 173A, optional sub-image extractor unit 179A, feature analysis unit 183A, and reference data unit 213A are included in operation system 303. Training images processing unit 320 and part location training unit 330 are included in training system 310. In accordance with this second embodiment of the present invention, the image data retrieval and preprocessing unit 173A, the optional sub-image extractor unit 179A, the feature analysis unit 183A, and the reference data unit 213A may function in like manner to the corresponding elements of the first embodiment. In accordance with this second embodiment illustrated in FIG. 4, the training images processing unit 320 and the part location training unit 330 train in estimating positions of typical part locations of an object. The knowledge accumulated through training by training system 310 is sent to reference data unit 213A. During regular operation of image processing unit 128A, reference data unit 213A provides reference data training knowledge to feature analysis unit 183A, for estimating object part locations.

Figure 5:
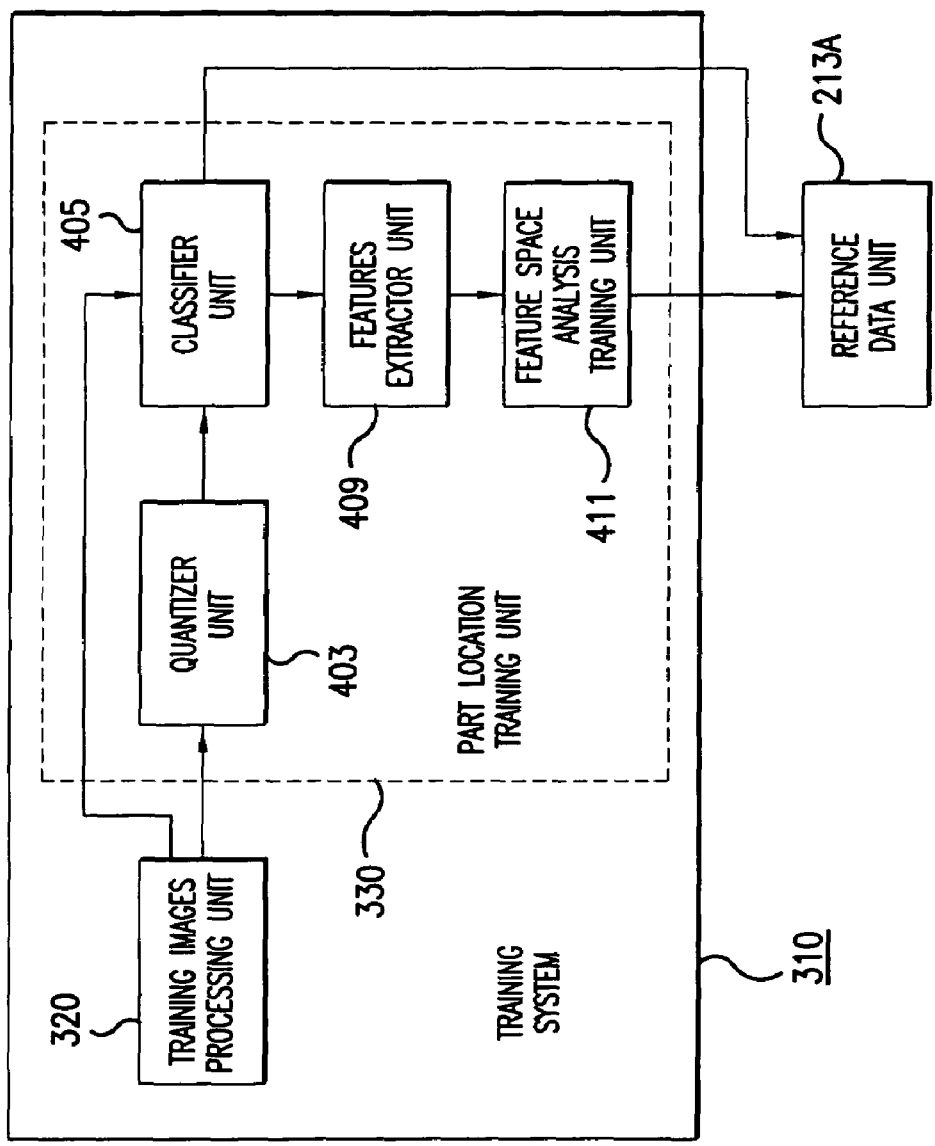
FIG. 5 is a block diagram of a training system included in an image processing unit for object part location estimation using feature value analysis according to a second embodiment of the present invention illustrated in FIG. 4.

FIG. 5 is a block diagram of a training system 310 included in an image processing unit 128A for object part location estimation using feature value analysis according to a second embodiment of the present invention illustrated in FIG. 4. As shown in FIG. 5, training system 310 includes: a training images processing unit 320; a quantizer unit 403; a classifier unit 405; a features extractor unit 409; and a feature space analysis training unit 411. Quantizer unit 403, classifier unit 405, features extractor unit 409 and feature space analysis training unit 411 are included in part location training unit 330. The units included in training system 310 implement algorithms to perform training for position estimation of object parts included in a type of objects. Training images processing unit 320 produces and processes training sub-images. The training sub-images contain object parts typical to the objects for which training system 310 trains. As an example, if training system 310 trains for position estimation of face objects, typical object parts include eye corners, nose corners, mouth corners, etc. Hence, training images processing unit 320 receives images of faces, and extracts windows, or sub-images that include eye corners, nose corners, mouth corners, etc. For each sub-image, training images processing unit 320 also extracts the correct (x, y) location of the object part in the sub-image. The coordinates (x, y) are in a coordinate system referenced to the sub-image. Training images processing unit 320 sends the training sub-images to classifier unit 405, and the extracted (x, y) locations of the object parts in the training sub-images to quantizer unit 403. Generally, quantizer unit 403 quantizes the (x, y) locations of the object parts; classifier unit 405 classifies the training sub-images into classes; features extractor unit 409 extracts features that discriminate among the sub-image classes; and feature space analysis training unit 411 extracts relationships between features and sub-image pixels. Reference data unit 213A receives training results from classifier unit 405 and from feature space analysis training unit 411. Training images processing unit 320 and part location training unit 330 perform image processing and part location training with sub-pixel accuracy.

Figure 6:
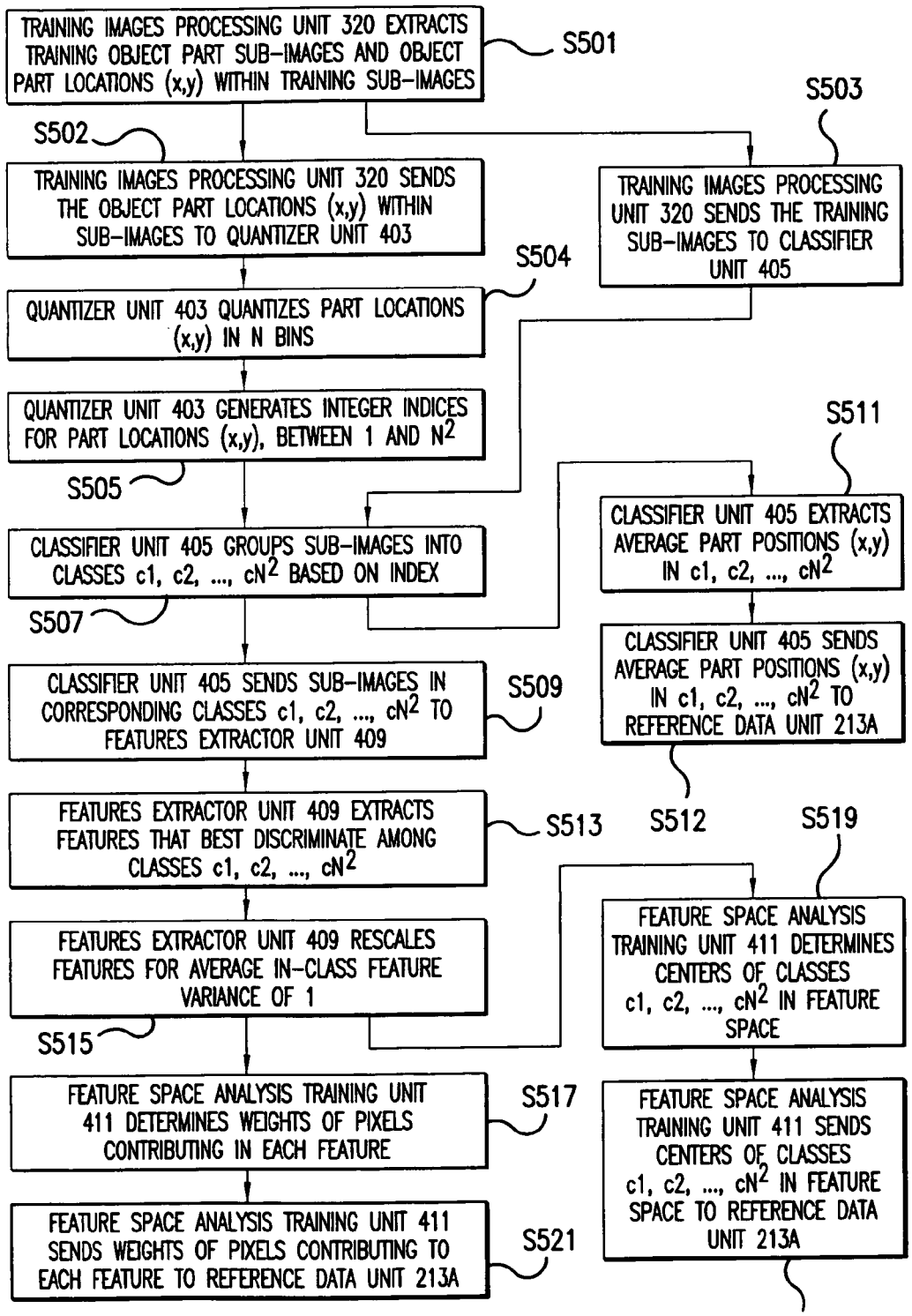
FIG. 6 is a flow diagram illustrating operations performed by a training system included in an image processing unit for object part location estimation using feature value analysis according to a second embodiment of the present invention illustrated in FIG. 5.

FIG. 6 is a flow diagram illustrating operations performed by a training system 310 included in an image processing unit 128A for object part location estimation using feature value analysis according to a second embodiment of the present invention illustrated in FIG. 5. Training images processing unit 320 inputs images of objects and extracts training object part sub-images and object part locations (x, y) within training sub-images (S501). Training images processing unit 320 sends the object part locations (x, y) within the training sub-images to quantizer unit 403 (S502). Since the coordinates (x, y) of an object part in its sub-image are in a coordinate system referenced to the sub-image, coordinates (x, y) can also be seen as displacements (dx, dy) of the object part from the center of its sub-image. Training images processing unit 320 also sends the training sub-images to classifier unit 405 (S503). Quantizer unit 403 quantizes the received part locations (x, y) into N bins (S504). The quantization is done separately for x and y coordinates. The x coordinates are quantized to integer values from 1 to N, and the y coordinates are quantized to integer values from 1 to N. Since N quantization values are possible for the x coordinates, and N quantization values are possible for y coordinates, $N^2$ quantization values are possible for part locations' coordinates (x, y). Quantizer unit 403 generates integer indices between 1 and $N^2$ for all quantized part locations (S505). Since each sub-image has a corresponding (x, y) part location, each sub-image also corresponds to an index between 1 and $N^2$ obtained from its quantized part location (x*, y*). Having received the training sub-images from training images processing unit 320, classifier unit 405 groups the sub-images into $N^2$ classes c1, c2, . . . , $cN^2$, based on the integer indexes of the sub-images (S507). The regression training problem becomes a multi-class classification problem. Classifier unit 405 extracts the average part positions (x, y) in classes c1, c2, . . . , $cN^2$ (S511). Classifier unit 405 then sends the average part positions (x, y) in classes c1, c2, . . . , $cN^2$ to reference data unit 213A (S512). Classifier unit 405 also sends the sub-images together with their assignments to classes c1, c2, . . . , $cN^2$, to features extractor unit 409 (S509).

Features extractor unit 409 then extracts features that best discriminate among classes c1, c2, . . . , $cN^2$ (S513). Linear discriminant analysis (LDA) can be used in step S513. Other methods can also be used. Features extractor unit 409 then rescales the extracted features so that the average within-class variance is 1 for each feature, making covariances the same (S515). The rescaling of extracted features for average within-class variance of 1 is optional.

Each feature is hence expressed as a linear combination of sub-image pixels. Feature space analysis training unit 411 determines and stores the weights of pixels contributing to each feature (S517). For an exemplary case in which 40 features are used, each pixel in an image has 40 weights associated with it, corresponding to each of the 40 features. Feature space analysis training unit 411 then sends the pixel weights contributing to each feature to reference data unit 213A (S521). Feature space analysis training unit 411 also determines and stores the centers of classes c1, c2, . . . , $cN^2$ in the feature space (S519). Feature space analysis training unit 411 then sends the centers of classes c1, c2, . . . , $cN^2$ in the feature space to reference data unit 213A (S523). Training system 310 hence provides training data to reference data unit 213A for estimating quantized displacements of object parts within sub-images.

Figure 7:
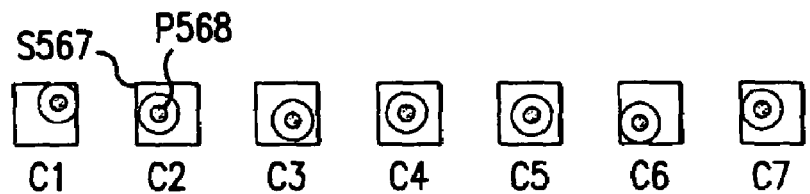
FIG. 7 illustrates aspects of the operation for generating sub-image classes in a training system included in an image processing unit for object part location estimation using feature value analysis according to a second embodiment of the present invention illustrated in FIG. 6.

FIG. 7 illustrates aspects of the operation for generating sub-image classes in a training system 310 included in an image processing unit 128A for object part location estimation using feature value analysis according to a second embodiment of the present invention illustrated in FIG. 6. Seven exemplary classes C1, C2, C3, C4, C5, C6, and C7 generated from training sub-images are shown. The object part in the training sub-images is an eye P568. Each class corresponds to a position of the eye P568 inside a sub-image window S567. Hence, class C1 has the eye located in the right upper corner of the sub-image, class C2 has the eye located in the middle left area of the sub-image, etc. Classifier unit 405 extracts the average positions of the eye inside each sub-image in step S511 in the flow diagram in FIG. 6. Features extractor unit 409 trains in classification of sub-images using linear discriminant analysis. For this purpose, features extractor unit 409 learns the features, or basis vectors that are optimal for distinguishing between the eye P568 at a close distance but with different positions as classified by classes C1, C2, C3, C4, C5, C6, and C7.

Figure 8:
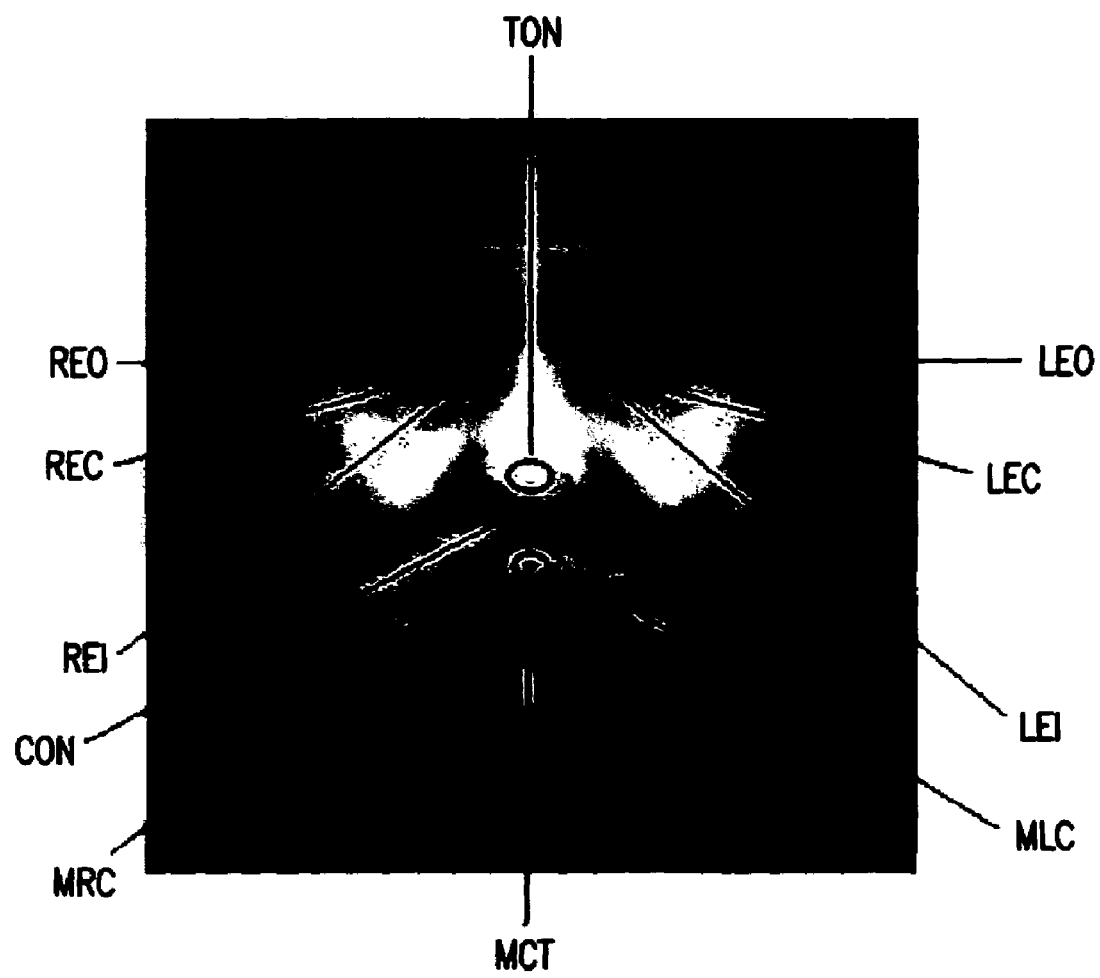
FIG. 8 illustrates aspects of the operation for selecting object parts in a training images processing unit included in a training system of an image processing unit for object part location estimation using feature value analysis according to a second embodiment of the present invention illustrated in FIG. 5.

FIG. 8 illustrates aspects of the operation for selecting object parts in a training images processing unit 320 included in a training system 310 of an image processing unit 128A for object part location estimation using feature value analysis according to a second embodiment of the present invention illustrated in FIG. 5. Training images processing unit 320 receives an image of an object such as a face object. Training images processing unit 320 designates object parts in the object. Such object parts include the Right Eye Outer corner (REO), the Right Eye Center (REC), the Right Eye Inner corner (REI), the Left Eye Outer corner (LEO), the Left Eye Center (LEC), the Left Eye Inner corner (LEI), the Tip of Nose (TON), the Center of Nose (CON), the Mouth Right Corner (MRC), the Mouth Left Corner (MLC), and the Mouth Center Tip (MCT). The object parts are labeled for training as shown in FIG. 8

Figure 9A:
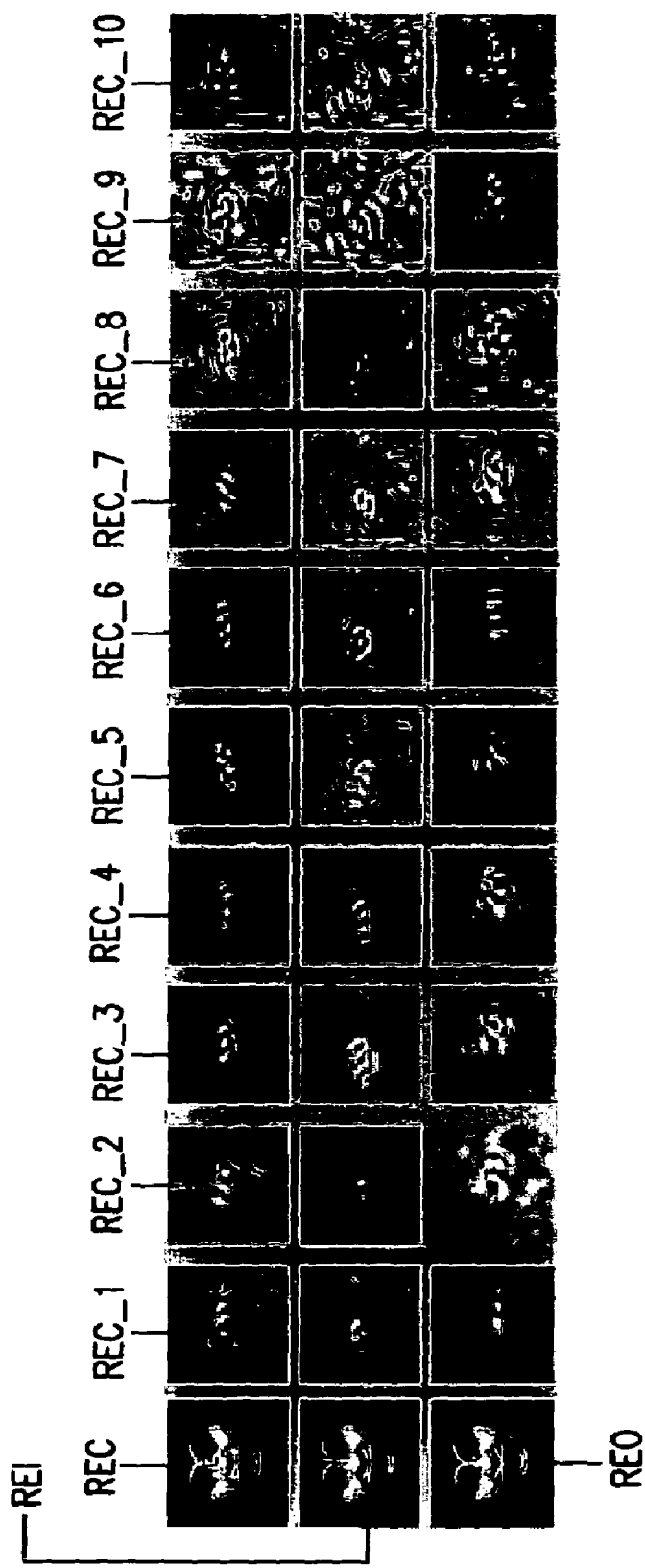
FIGS. 9A, 9B, 9C and 9D illustrate exemplary right eye, left eye, nose, and mouth object parts basis images used in linear discriminant analysis by a training system included in an image processing unit for object part location estimation using feature value analysis according to a second embodiment of the present invention illustrated in FIG. 6.
Figure 9B:
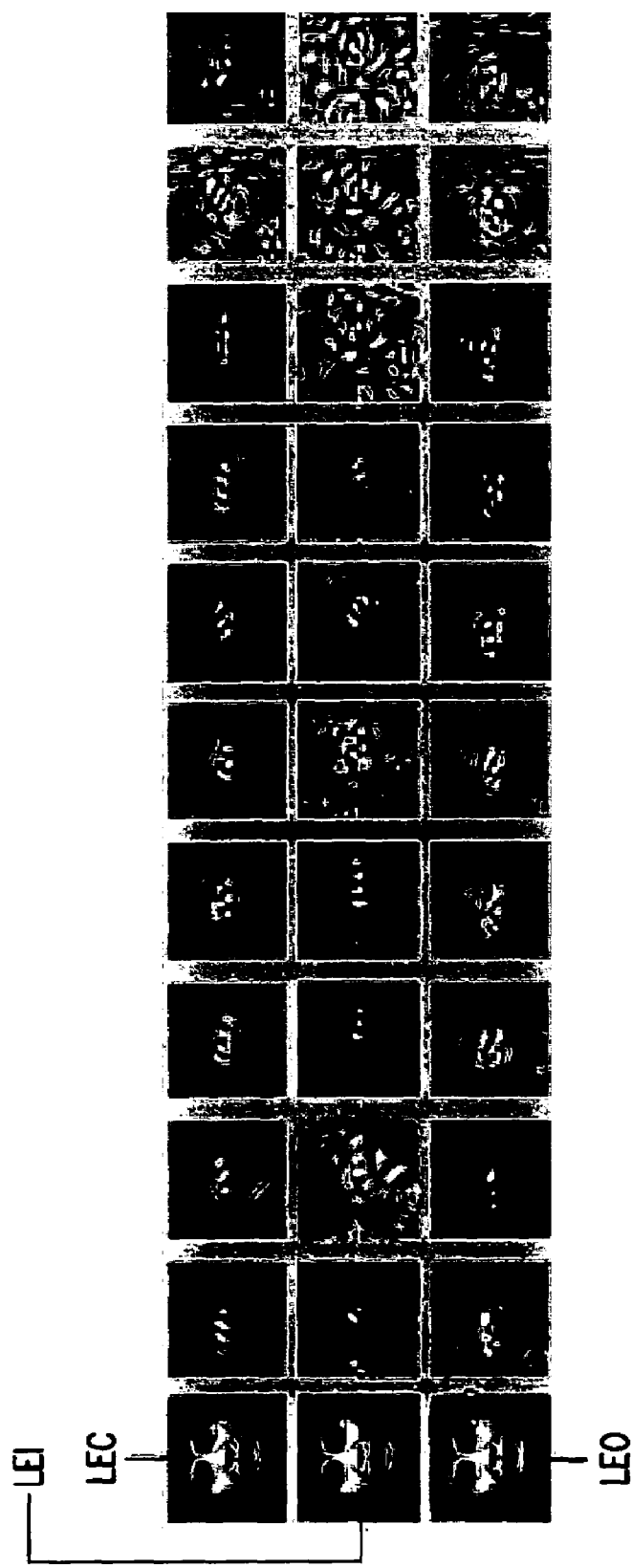
Figure 9C:
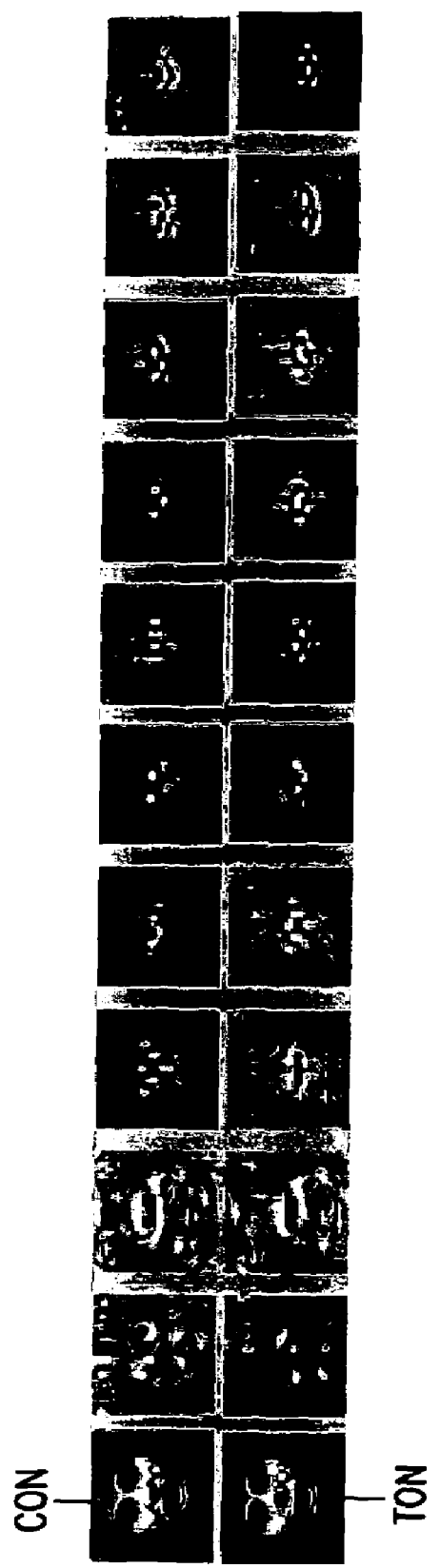
Figure 9D:
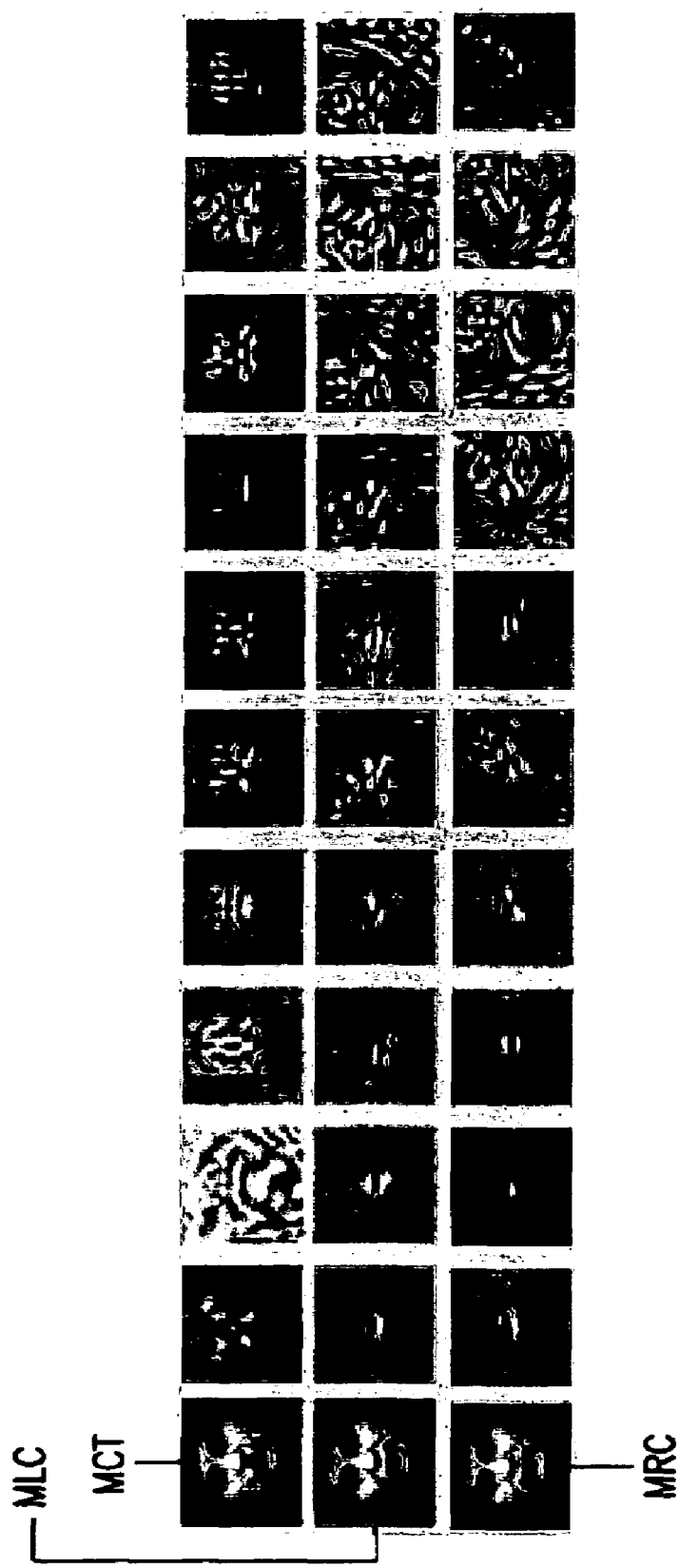

FIGS. 9A, 9B, 9C and 9D illustrate exemplary right eye, left eye, nose, and mouth object parts basis images used in linear discriminant analysis (LDA) by a training system 310 included in an image processing unit 18A for object part location estimation using feature value analysis according to a second embodiment of the present invention illustrated in FIG. 6. FIG. 9A illustrates LDA basis images for REO, REC and REI eye object parts shown in FIG. 8. Ten LDA basis images are used for each object part considered. For example, the Right Eye Center (REC) is described by basis images REC_1, REC_2, REC_3, REC_4, REC_5, REC_6, REC_7, REC_8, REC_9, REC_10. FIG. 9B illustrates LDA basis images for LEO, LEC and LEI eye object parts. FIG. 9C illustrates LDA basis images for TON and CON nose object parts. FIG. 9D illustrates LDA basis images for MRC, MLC, and MCT mouth object parts.

Figure 10:
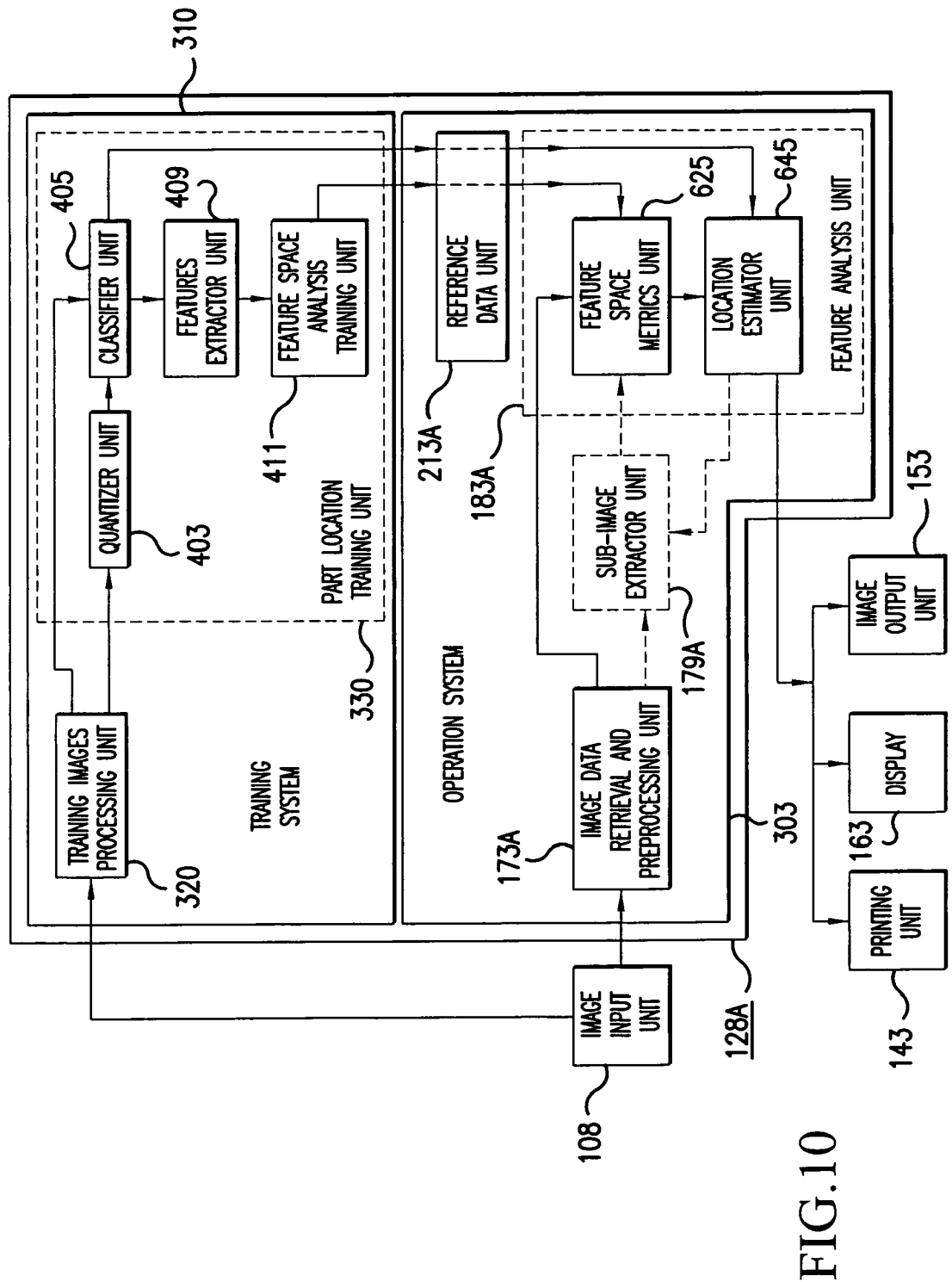
FIG. 10 is a block diagram illustrating additional aspects of an image processing unit for object part location estimation using feature value analysis according to a second embodiment of the present invention illustrated in FIG. 4.

FIG. 10 is a block diagram illustrating additional aspects of an image processing unit 128A for object part location estimation using feature value analysis according to a second embodiment of the present invention illustrated in FIG. 4. As shown in FIG. 10, image processing unit 128A includes the following components: a training images processing unit 320; a quantizer unit 403; a classifier unit 405; a features extractor unit 409; and a feature space analysis training unit 411; an image data retrieval and preprocessing unit 173A; an optional sub-image extractor unit 179A; a feature space metrics unit 625; a location estimator unit 645; and a reference data unit 213A. Training images processing unit 320, quantizer unit 403, classifier unit 405, features extractor unit 409, and feature space analysis training unit 411 are included in training system 310. Image data retrieval and preprocessing unit 173A, sub-image extractor unit 179A, feature space metrics unit 625, location estimator unit 645, and reference data unit 213A are included in operation system 303. Feature space metrics unit 625 and location estimator unit 645 are components of feature analysis unit 183A.

Feature space metrics unit 625 and location estimator unit 645 communicate with reference data unit 213A to retrieve training results for location estimation and feature values analysis. Feature space metrics unit 625 uses feature analysis training data that was received from feature space analysis training unit 411. Location estimator unit 645 uses part location training results from reference data unit 213A. The part location training results are received from classifier unit 405. Location estimator unit 645 can perform iterations to sub-image extractor unit 179A to refine the position estimate of an object part location.

Operation of the image processing unit 128A can generally be divided into two stages: (1) training; and (2) operation for object part location estimation. The principles involved in the training stage have been described in the flow diagram of FIG. 6. The principles involved in the operation for object part location estimation stage are described in detail below.

Figure 11:
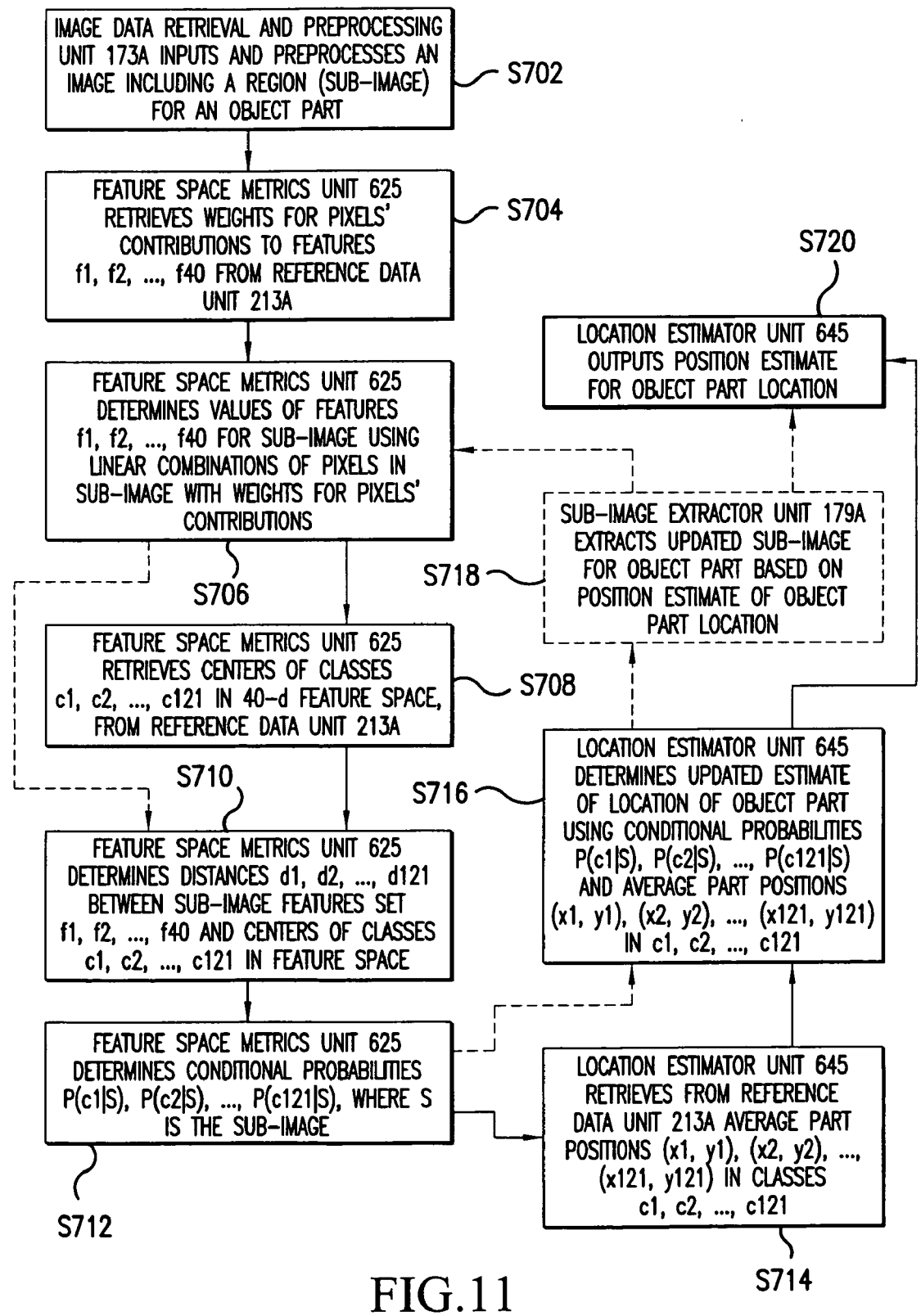
FIG. 11 is a flow diagram illustrating operations performed by an image processing unit for estimating an object part location using feature value analysis according to a second embodiment of the present invention illustrated in FIG. 10.

FIG. 11 is a flow diagram illustrating operations performed by an image processing unit 128A for estimating an object part location using feature value analysis according to a second embodiment of the present invention illustrated in FIG. 10. The flow diagram in FIG. 11 illustrates the steps performed during operation for object part location estimation. An exemplary number of 40 features for feature value analysis, and an exemplary number of 121 sub-image training classes are used. Image data retrieval and preprocessing unit 173A inputs and preprocesses an image including a region (sub-image) for an object part (S702). In one implementation, the input sub-image with the object part has the same size as the training object part sub-images used in training for that type of object part. Preprocessing operations may include image cropping, rotation, registration, etc.

Feature space metrics unit 625 receives the sub-image. Feature space metrics unit 625 retrieves from reference data unit 213A the pixel weights determined by training, for pixels' contributions to features f1, f2, ..., f40 (S704). Feature space metrics unit 625 then determines the values of the 40 features f1, f2, ..., f40 for the current sub-image (S706), using linear combinations of pixels in the sub-image, with pixel weights retrieved from reference data unit 213A. Feature space metrics unit 625 also retrieves from reference data unit 213A the centers of classes c1, c2, ..., c121 in the 40-dimensional feature space (S708). Feature space metrics unit 625 next determines distances d1, d2, ..., d121 between the sub-image features set f1, f2, ..., f40, and the centers of classes c1, c2, ..., c121 in the 40-dimensional feature space (S710). Using distances d1, d2, ..., d121, feature space metrics unit 625 determines conditional probabilities for contribution of classes c1, c2, ..., c121 to the sub-image, P(c1|S), P(c2|S), ..., P(c121|S), where S is the sub-image (S712). The probability distribution is assumed to be Gaussian. The conditional probabilities P(c1|S), P(c2|S), ..., P(c121|S) are calculated using the formula:

$$P(ci|S) = M*P(ci)*\exp(-di^2/2) \quad (1)$$

where M is a constant such that $$P(c1|S) + P(c2|S) + \ldots + P(c121|S) = 1. \quad (2)$$

If the average within-class variances of features have not been normalized to 1, the probability would include a variance term in the exponential, of the form $\exp(-di^2/(2*variance))$. Steps S706 and S710 are performed with sub-pixel accuracy. Location estimator unit 645 receives the conditional probabilities P(c1|S), P(c2|S), ..., P(c121|S) and retrieves the average part positions (x1, y1), (x2, y2), ..., (x121, y121) in classes c1, c2, ..., c121 from reference data unit 213A (S714). Location estimator unit 645 then determines an estimate for object part location (S716). Step S716 is also performed with sub-pixel accuracy. The updated estimate for the object part location is determined using formula (3) below, which converts location probabilities to (x, y) coordinates:

$$\text{Location Estimate} = (x1, y1)*P(c1|S) + (x2, y2)*P(c2|S) + \ldots + (x121, y121)*P(c121|S). \quad (3)$$

Location estimator unit 645 outputs the object part location estimate obtained from equation (3) (S720). Such location estimates may be output to image output unit 153, printing unit 143, and/or display 163.

Optionally, location estimator unit 645 may send the location estimate for the object part to sub-image extractor unit 179A, which extracts an updated sub-image for the object part based on the received location estimate (S718). Sub-image extractor unit 179A sends the updated object part region to feature space metrics unit 625. Steps S706, S710, S712, S716, S718 are repeated iteratively to refine the location estimate for the object part. Refinement of the location estimate for the object part is performed at sub-pixel accuracy. Steps S708 and S714 may be skipped in the iterations, since reference data retrieved once from reference data unit 213A can be used again for a given object part. When the iteration stops, location estimator unit 645 outputs the refined location estimate obtained for the object part location (S720). Such location results may be output to image output unit 153, printing unit 143, and/or display 163.

Figure 12A:
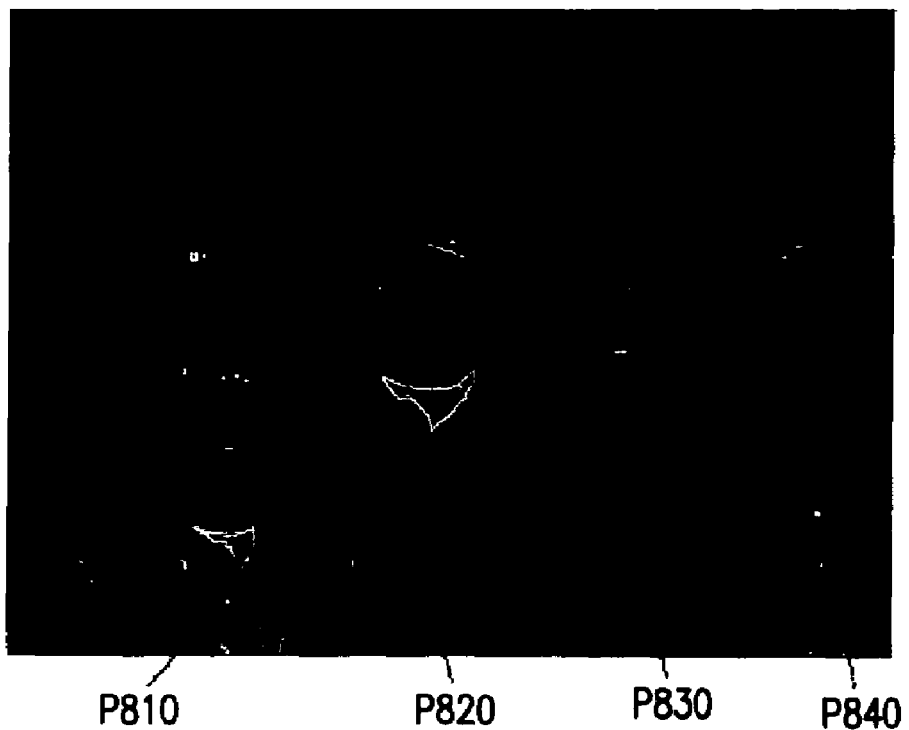
FIGS. 12A, 12B and 12C illustrate aspects of the operation for preprocessing digital image data in an image data retrieval and preprocessing unit included in an image processing unit for estimating an object part location using feature value analysis according to an embodiment of the present invention illustrated in FIG. 2.
Figure 12B:
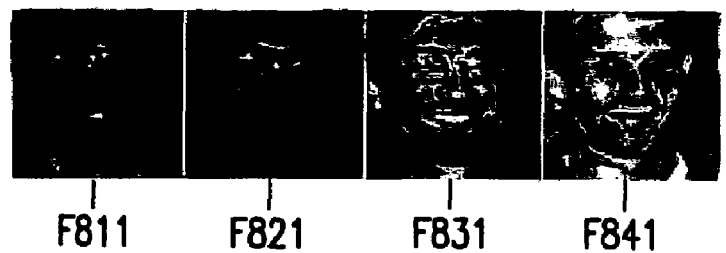
Figure 12C:
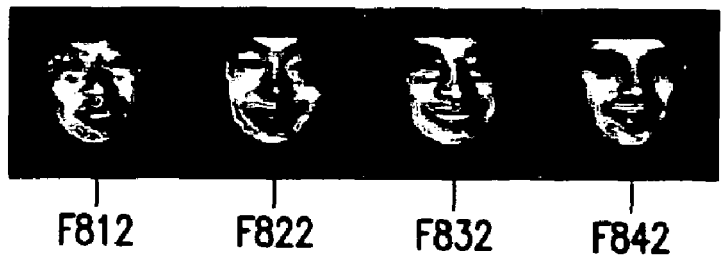

FIGS. 12A, 12B and 12C illustrate aspects of the operation for preprocessing digital image data in an image data retrieval and preprocessing unit 173 included in an image processing unit 128 for estimating an object part location using feature value analysis according to an embodiment of the present invention illustrated in FIG. 2. A photograph, shown in FIG. 12A, including four persons P810, P820, P830 and P840 is received by image data retrieval and preprocessing unit 173 from image input unit 108. Image data retrieval and preprocessing unit 173 detects the faces of persons P810, P820, P830 and P840, and crops the faces to obtain cropped images F811, F821, F831 and F841 in FIG. 12B. Image data retrieval and preprocessing unit 173 next masks out the background in the cropped images and normalizes lighting, obtaining face images F812, F822, F832 and F842 in FIG. 12C. Faces F812, F822, F832 and F842 are then sent to feature analysis unit 183 shown in FIG. 2.

Figure 13:
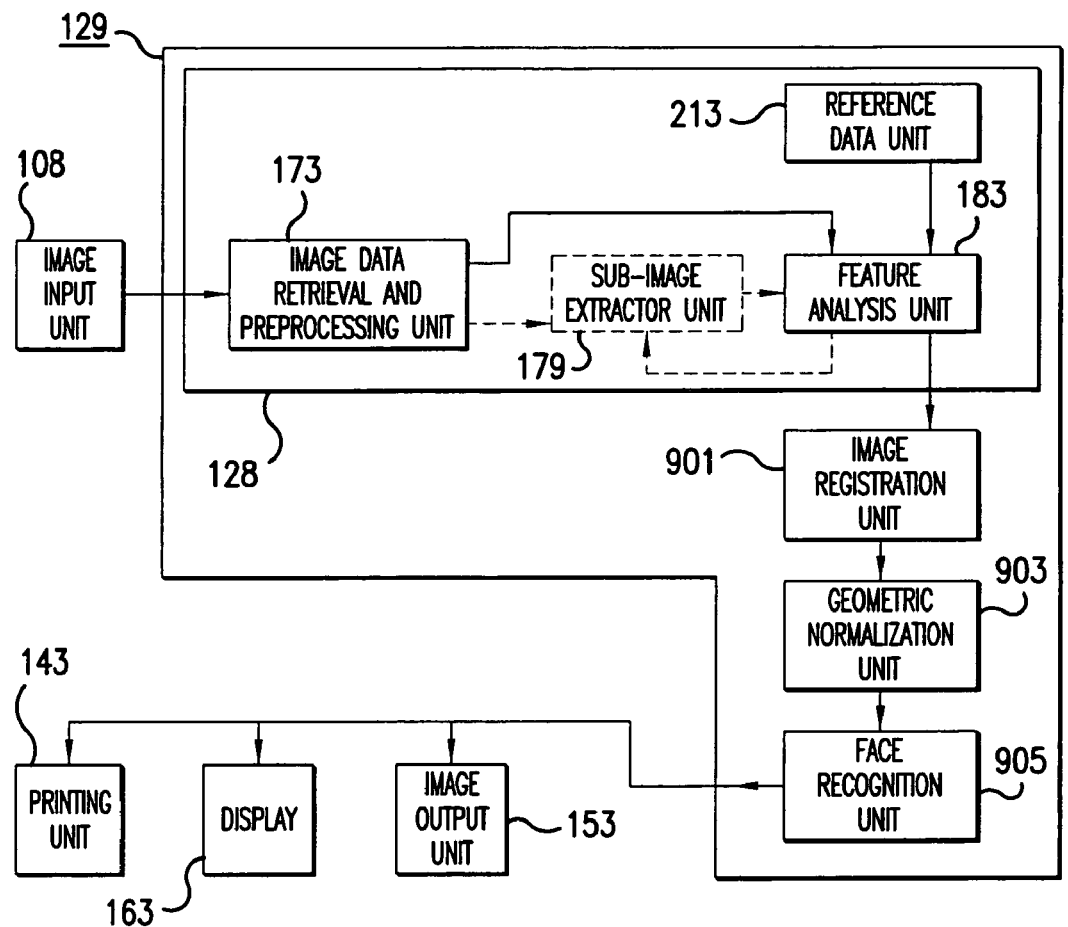
FIG. 13 is a block diagram of a system for performing face recognition including an image processing unit for object part location estimation using feature value analysis according to a third embodiment of the present invention.

FIG. 13 is a block diagram of a system 129 for performing face recognition including an image processing unit 128 for object part location estimation using feature value analysis according to a third embodiment of the present invention. System 129 includes: an image processing unit 128 for object part location estimation using feature value analysis; an image registration unit 901; a geometric normalization unit 903; and a face recognition unit 905. In accordance with this third embodiment of the present invention, the image data retrieval and preprocessing unit 173, the optional sub-image extractor unit 179, the feature analysis unit 183, and the reference data unit 213 included in image processing unit 128 may function in like manner to the corresponding elements of the first or second embodiment. In accordance with this third embodiment illustrated in FIG. 13, image input unit 108 sends digital image data including faces, to image processing unit 128, which estimates object parts locations using feature value analysis. Relevant object parts in face images include eyes corners, mouth corners, nose corners, etc. Individual face images, together with object part location estimates, are output by image processing unit 128 and sent to image registration unit 901, which performs face registration by applying appropriate rotations, translations and scaling to each face image. Geometric normalization unit 903 receives the registered images and normalizes the sizes of the images using distances between the localized face features (object parts). Geometrically normalized images from geometric normalization unit 903, together with the object part location estimates, are then sent to face recognition unit 905. Face recognition unit 905 performs face recognition including classification of the faces in images. Face recognition unit 905 outputs face images, together with face identification and/or classification. Such face recognition results may be output to image output unit 153, display 163, and/or printing unit 143.

Figure 14:
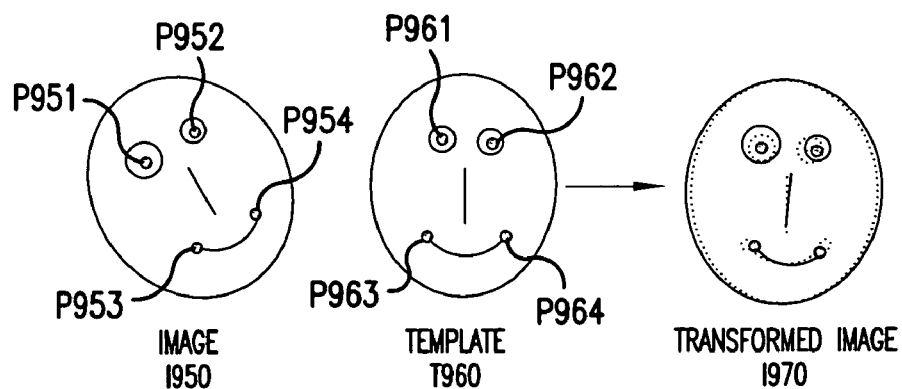
FIG. 14 illustrates aspects of the operation for face registration performed by an image registration unit included in a system for face recognition according to a third embodiment of the present invention illustrated in FIG. 13.

FIG. 14 illustrates aspects of the operation for face registration performed by an image registration unit 901 included in a system 129 for face recognition according to a third embodiment of the present invention illustrated in FIG. 13. An image I950 with localized object parts output by an image processing unit 128 is compared with a template image T960. For this purpose, the positions of object parts P951, P952, P953 and P954 (eyes and mouth corners) are compared with the positions of the eyes and mouth corners P961, P962, P963 and P964 of the template image T960. A transformation is applied including rotation, translation and scaling, to obtain transformed image I970 which has the same orientation, size, and rotational position as the template image T960. Well-registered faces such as transformed image I970 give better face recognition results.

The embodiments described above can be used for estimating object part locations using feature value analysis in various technologies. Examples of technologies where the described embodiments can be used are face recognition, ground object recognition such as vehicle recognition, etc.

Although detailed embodiments and implementations of the present invention have been described above, it should be apparent that various modifications are possible without departing from the spirit and scope of the present invention.

I claim:

1. A method of estimating an object part location in a digital image using feature value analysis by utilizing one or more processors said method comprising:
   accessing digital image data representing a region including an object part of a digital image;
   accessing, by utilizing one or more processors, reference data including
      class data of classes relating to predetermined positions of said object part in predetermined regions, and
      features that discriminate among said classes;
   calculating feature values for said features in said region using pixel values within said region;
   determining a location estimate of said object part using said feature values and said reference data;
   extracting an updated region around said location estimate of said object part, and
   iteratively updating said location estimate for said object part by performing said calculating step and said determining step for said updated region.

2. A method of estimating an object part location in a digital image using feature value analysis by utilizing one or more processor, said method comprising:
   accessing digital image data representing a region including an object part of a digital image;
   accessing, by utilizing one or more processors, reference data including
      class data of classes relating to predetermined positions of said object part in predetermined regions, and
      features that discriminate among said classes;
   calculating feature values for said features in said region using pixel values within said region;
   determining a location estimate of said object part using said feature values and said reference data; and
   performing geometric normalization of said digital image data after said determining step, using said location estimate of said object part.

3. The method of estimating an object part location in a digital image using feature value analysis by utilizing one or more processors as recited in claim 2, further comprising:
   performing face recognition after said step of performing geometric normalization, when said digital image includes a face and said object part is included in said face.

4. A method of estimating an object part location in a digital image using feature value analysis by utilizing one or more processors, said method comprising:
   accessing digital image data representing a region including an object part of a digital image;
   accessing, by utilizing one or more processors, reference data including
      class data of classes relating to predetermined positions of said object part in predetermined regions, and
      features that discriminate among said classes;
   calculating feature values for said features in said region using pixel values within said region;
   determining a location estimate of said object part using said feature values and said reference data; and
   adjusting size and orientation of said region including said object part before said step of calculating feature values for said features in said region.

5. A method of estimating an object part location in a digital image using feature value analysis by utilizing one or more processors, said method comprising:
   accessing digital image data representing a region including an object part of a digital image;
   accessing, by utilizing one or more processors, reference data including
      class data of classes relating to predetermined positions of said object part in predetermined regions, and
      features that discriminate among said classes;
   calculating feature values for said features in said region using pixel values within said region;
   determining a location estimate of said object part using said feature values and said reference data; and
   training in estimating object part locations using training images, to obtain said reference data
   wherein said training step includes
   extracting from said training images training sub-images including said object part in said predetermined positions,
   quantizing coordinates of said object part in said training sub-images,
   classifying said training sub-images into said classes, based on said quantized coordinates,
   determining average positions of said object part in said classes,
   extracting said features for discriminating among said classes, by calculating feature weights of pixels from said training sub-images to express said features as linear combinations of said pixels from said training sub-images using said feature weights, and
   determining centers of said classes using said features.

6. The method of estimating an object part location in a digital image using feature value analysis by utilizing one or more processors as recited in claim 5, wherein said sub-step of extracting said features for discriminating among said classes uses linear discriminant analysis.

7. The method of estimating an object part location in a digital image using feature value analysis by utilizing one or more processors as recited in claim 5, wherein said step of calculating feature values for said features in said region calculates feature values using said feature weights for pixels within said region, and said step of determining a location estimate of said object part uses probabilities of said region belonging to said classes and said average positions of said object part in said classes.

8. The method of estimating an object part location in a digital image using feature value analysis by utilizing one or more processors as recited in claim 7, wherein said step of determining a location estimate of said object part converts said probabilities to said location estimate.

9. An apparatus for estimating an object part location in a digital image using feature value analysis using at least one processor, said apparatus comprising:
an image data unit in said at least one processor, for providing digital image data representing a region including an object part of a digital image;
a reference data unit in said at least one processor, for storing reference data including
class data of classes relating to predetermined positions of said object part in predetermined regions, and
features that discriminate among said classes;
a feature analysis unit in said at least one processor, for estimating location of said object part in said region, said feature analysis unit estimating location of said object part by
calculating feature values for said features in said region using pixel values within said region, and
determining a location estimate of said object part using said feature values and said reference data from said reference data unit; and
a sub-image extractor unit in said at least one processor for extracting an updated region around said location estimate of said object part.

10. The apparatus according to claim 9, wherein said sub-image extractor unit sends said updated region to said feature analysis unit, and said feature analysis unit updates said location estimate of said object part by
calculating updated feature values for said features in said updated region using pixel values within said updated region, and
determining an updated location estimate of said object part using said updated feature values and said reference data from said reference data unit.

11. An apparatus for estimating an object part location in a digital image using feature value analysis using at least one processor, said apparatus comprising:
an image data unit in said at least one processor, for providing digital image data representing a region including an object part of a digital image;
a reference data unit in said at least one processor, for storing reference data including
class data of classes relating to predetermined positions of said object part in predetermined regions, and
features that discriminate among said classes;
a feature analysis unit in said at least one processor, for estimating location of said object part in said region, said feature analysis unit estimating location of said object part by
calculating feature values for said features in said region using pixel values within said region, and
determining a location estimate of said object part using said feature values and said reference data from said reference data unit
a geometric normalization unit in said at least one processor for performing geometric normalization of said digital image using said location estimate of said object part to obtain a geometrically normalized image, and
a face recognition unit in said at least one processor for performing face recognition of said geometrically normalized image, when said geometrically normalized image includes a face and said object part is included in said face.

12. An apparatus for estimating an object part location in a digital image using feature value analysis using at least one processor, said apparatus comprising:
an image data unit in said at least one processor, for providing digital image data representing a region including an object part of a digital image;
a reference data unit in said at least one processor, for storing reference data including
class data of classes relating to predetermined positions of said object part in predetermined regions, and
features that discriminate among said classes;
a feature analysis unit in said at least one processor, for estimating location of said object part in said region, said feature analysis unit estimating location of said object part by
calculating feature values for said features in said region using pixel values within said region, and
determining a location estimate of said object part using said feature values and said reference data from said reference data unit; and
an image preprocessing unit in said at least one processor for adjusting size and orientation of said region including said object part, before said region is accessed by said feature analysis unit.

13. An apparatus for estimating an object part location in a digital image using feature value analysis using at least one processor, said apparatus comprising:
an image data unit in said at least one processor, for providing digital image data representing a region including an object part of a digital image;
a reference data unit in said at least one processor, for storing reference data including
class data of classes relating to predetermined positions of said object part in predetermined regions, and
features that discriminate among said classes;
a feature analysis unit in said at least one processor, for estimating location of said object part in said region, said feature analysis unit estimating location of said object part by
calculating feature values for said features in said region using pixel values within said region, and
determining a location estimate of said object part using said feature values and said reference data from said reference data unit; and
a training unit for training in estimating object part locations using training images, to obtain said reference data stored in said reference data unit,
wherein said training unit comprises:
a training images unit for extracting from said training images training sub-images including said object part in said predetermined positions,
a quantizer unit for quantizing coordinates of said object part in said training sub-images,
a classifier unit for classifying said training sub-images into said classes based on said quantized coordinates and determining average positions of said object part in said classes, and
a feature training unit for extracting said features for discriminating among said classes, by calculating feature weights of pixels from said training sub-images to express said features as linear combinations of said pixels from said training sub-images using said feature weights.

14. The apparatus according to claim 13, wherein said feature training unit extracts features for discriminating among said classes using linear discriminant analysis.

15. The apparatus according to claim 13, wherein
said reference data unit stores said classes, said feature weights of pixels, and said average positions of said object part in said classes, and
said feature analysis unit calculates feature values for said features in said region using said feature weights of pixels within said region, and calculates probabilities for said region belonging to said classes.

16. The apparatus according to claim 15, wherein said feature analysis unit converts said probabilities to said location estimate of said object part.

17. A computer readable medium storing a computer program for estimating an object part location in a digital image using feature value analysis, the computer program when executed causes a processor to perform the steps of:
accessing digital image data representing a region including an object part of a digital image;
accessing, by utilizing one or more processors, reference data including
class data of classes relating to predetermined positions of said object part in predetermined regions, and
features that discriminate among said classes;
calculating feature values for said features in said region using pixel values within said region;
determining a location estimate of said object part using said feature values and said reference data;
extracting an updated region around said location estimate of said object part; and
iteratively updating said location estimate for said object part by performing said calculating step and said determining step for said updated region.

18. A computer readable medium storing a computer program for estimating an object part location in a digital image using feature value analysis, the computer program when executed causes a processor to perform the steps of:
accessing digital image data representing a region including an object part of a digital image;
accessing, by utilizing one or more processors, reference data including
class data of classes relating to predetermined positions of said object part in predetermined regions, and
features that discriminate among said classes;
calculating feature values for said features in said region using pixel values within said region;
determining a location estimate of said object part using said feature values and said reference data; and
performing geometric normalization of said digital image data after said determining step, using said location estimate of said object part.

19. The computer readable medium storing a computer program for estimating an object part location in a digital image using feature value analysis as recited in claim 18, the computer program when executed causes the processor to further perform the step of:
performing face recognition after said step of performing geometric normalization, when said digital image includes a face and said object part is included in said face.

20. A computer readable medium storing a computer program for estimating an object part location in a digital image using feature value analysis, the computer program when executed causes a processor to perform the steps of:
accessing digital image data representing a region including an object part of a digital image;
accessing, by utilizing one or more processors, reference data including
class data of classes relating to predetermined positions of said object part in predetermined regions, and
features that discriminate among said classes;
calculating feature values for said features in said region using pixel values within said region;
determining a location estimate of said object part using said feature values and said reference data; and
adjusting size and orientation of said region including said object part before said step of calculating feature values for said features in said region.

21. A computer readable medium storing a computer program for estimating an object part location in a digital image using feature value analysis, the computer program when executed causes a processor to perform the steps of:
accessing digital image data representing a region including an object part of a digital image;
accessing, by utilizing one or more processors, reference data including
class data of classes relating to predetermined positions of said object part in predetermined regions, and
features that discriminate among said classes;
calculating feature values for said features in said region using pixel values within said region;
determining a location estimate of said object part using said feature values and said reference data; and
training in estimating object part locations using training images, to obtain said reference data,
wherein said training step includes
extracting from said training images training sub-images including said object part in said predetermined positions,
quantizing coordinates of said object part in said training sub-images,
classifying said training sub-images into said classes, based on said quantized coordinates,
determining average positions of said object part in said classes,
extracting said features for discriminating among said classes, by calculating feature weights of pixels from said training sub-images to express said features as linear combinations of said pixels from said training sub-images using said feature weights, and
determining centers of said classes using said features.

22. The computer readable medium storing a computer program for estimating an object part location in a digital image using feature value analysis as recited in claim 21, wherein said sub-step of extracting said features for discriminating among said classes uses linear discriminant analysis.

23. The computer readable medium storing a computer program for estimating an object part location in a digital image using feature value analysis as recited in claim 21, wherein
said step of calculating feature values for said features in said region calculates feature values using said feature weights for pixels within said region, and
said step of determining a location estimate of said object part uses probabilities of said region belonging to said classes and said average positions of said object part in said classes.

24. The computer readable medium storing a computer program for estimating an object part location in a digital image using feature value analysis as recited in claim 23, wherein said step of determining a location estimate of said object part converts said probabilities to said location estimate.

* * * * *